(12) United States Patent
Xue et al.

(10) Patent No.: US 12,061,662 B2
(45) Date of Patent: Aug. 13, 2024

(54) METHODS, APPARATUSES AND SYSTEMS FOR DISPLAYING ALARM FILE

(71) Applicant: HANGZHOU HIKVISION DIGITAL TECHNOLOGY CO., LTD., Zhejiang (CN)

(72) Inventors: Xingming Xue, Zhejiang (CN); Zhihai Wang, Zhejiang (CN); Zhuzhen Tang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 106 days.

(21) Appl. No.: 17/772,811

(22) PCT Filed: Nov. 2, 2020

(86) PCT No.: PCT/CN2020/125955
§ 371 (c)(1),
(2) Date: Sep. 13, 2022

(87) PCT Pub. No.: WO2021/088773
PCT Pub. Date: May 14, 2021

(65) Prior Publication Data
US 2022/0414178 A1  Dec. 29, 2022

(30) Foreign Application Priority Data
Nov. 6, 2019  (CN) .......................... 201911077085.2

(51) Int. Cl.
*G06F 16/22* (2019.01)
*G06F 16/182* (2019.01)
*G06F 16/955* (2019.01)

(52) U.S. Cl.
CPC ........ *G06F 16/9566* (2019.01); *G06F 16/183* (2019.01); *G06F 16/22* (2019.01)

(58) Field of Classification Search
CPC .............................. G06F 16/22; G06F 16/186
See application file for complete search history.

(56) References Cited

U.S. PATENT DOCUMENTS

| 6,349,333 | B1 | 2/2002 | Panikatt et al. |
| 7,561,567 | B1* | 7/2009 | Olson .................. G06F 13/126 |
| | | | 370/389 |

(Continued)

FOREIGN PATENT DOCUMENTS

| CN | 103543700 A | 1/2014 |
| CN | 104010039 A | 8/2014 |

(Continued)

OTHER PUBLICATIONS

State Intellectual Property Office of the People's Republic of China, Office Action and Search Report Issued in corresponding Chinese Application No. 201911077085.2, Mar. 29, 2023, (Submitted with Machine Translation).

(Continued)

*Primary Examiner* — Grace Park
(74) *Attorney, Agent, or Firm* — Ladas & Parry, LLP

(57) ABSTRACT

The present disclosure relates to methods, apparatuses and systems for displaying an alarm file and belongs to the field of communications. One of the method includes: through a persistent connection with a service end, receiving a data packet corresponding to the alarm file sent by the service end, wherein the service end releases a storage resource occupied by the alarm file after sending the alarm file; obtaining the alarm file by parsing the data packet corresponding to the alarm file; generating a uniform resource locator (URL) of the alarm file; displaying the alarm file based on the URL of the alarm file. The present disclosure can reduce wastes of the storage resource of the service end.

12 Claims, 7 Drawing Sheets

(56) References Cited

U.S. PATENT DOCUMENTS

| | | | | |
|---|---|---|---|---|
| 2004/0249903 | A1* | 12/2004 | Ha | H04L 12/403 |
| | | | | 709/208 |
| 2012/0313774 | A1* | 12/2012 | Sivakumar | G08B 25/10 |
| | | | | 340/539.11 |
| 2017/0019458 | A1* | 1/2017 | Perahia | H04L 69/40 |

FOREIGN PATENT DOCUMENTS

| | | | |
|---|---|---|---|
| CN | 105610605 | A | 5/2016 |
| CN | 106100914 | A | 11/2016 |
| CN | 107231406 | A | 10/2017 |
| CN | 107342896 | A | 11/2017 |
| CN | 107426029 | A | 12/2017 |
| CN | 109067899 | A | 12/2018 |
| CN | 109270850 | A | 1/2019 |
| CN | 109508273 | A | 3/2019 |
| CN | 111427850 | A | 7/2020 |
| GB | 2511067 | A | 8/2014 |
| GB | 201501437 | | 3/2015 |
| GB | 2534849 | A | 8/2016 |
| JP | 2004070859 | A | 3/2004 |
| JP | 2011118733 | A | 6/2011 |

OTHER PUBLICATIONS

The Extended European Search Report for European Patent Application 20885783.9 issued on Oct. 19, 2022.

International Search Report in International Application No. PCT/CN2020/125955 mailed on Feb. 3, 2021, with English translation provided by WIPO.

Written Opinion of the International Searching Authority in International Application No. PCT/CN2020/125955 mailed on Feb. 3, 2021, with English translation provided by Google Translate.

\* cited by examiner

METHODS, APPARATUSES AND SYSTEMS FOR DISPLAYING ALARM FILE

CROSS-REFERENCE TO RELATED APPLICATIONS

The present application is a U.S. National Stage of International Application No. PCT/CN2020/125955 filed on Nov. 2, 2020 which claims priority to Chinese Patent Application No. 201911077085.2 entitled "METHODS, APPARATUSES AND SYSTEMS FOR DISPLAYING ALARM FILE" filed on Nov. 6, 2019, the entire contents of the above referred applications are incorporated herein by reference.

TECHNICAL FIELD

The present disclosure relates to the field of communications, and in particular to methods, apparatuses and systems for displaying an alarm file.

BACKGROUND

In the security industry, an alarm file may be requested from a service end by use of a browser and displayed through the browser. The alarm file may be an alarm picture or the like, and the service end may acquire an alarm file and then store it for request of the browser.

At present, a browser may request an alarm file from a service end by polling, that is, the browser sends a request message to the service end at an interval of time and the service end receives the request message. If the service end has stored the alarm file currently, the service end sends a uniform resource locator (URL) of the alarm file to the browser and the browser acquires raw data based on the URL of the alarm file and parses it into an alarm file of normal pixel display; if the service end does not store the alarm file, the service end notifies the browser.

During implementation of the present disclosure, the inventor finds at least following defects existing in the above manner:

When a browser requests an alarm file from a service end by polling to achieve displaying of the alarm file, the service end is to send a URL of the alarm file accessible on the service end to the browser such that the browser may display the alarm file based on the URL. As a result, the service end is to store the alarm file, leading to large wastes of storage resource of the service end.

SUMMARY

In one or more embodiments of the present disclosure, a method, an apparatus and a system for displaying an alarm file, and an electronic device, a computer readable storage medium and a computer program product are provided, so as to reduce waste of a storage resource of a service end. The technical solution is described below.

According to an aspect, a method of displaying an alarm file is provided in the present disclosure. The method includes:
 through a persistent connection with a service end, receiving a data packet corresponding to the alarm file sent by the service end, where the service end releases a storage resource occupied by the alarm file after sending the alarm file;
 obtaining the alarm file by parsing the data packet corresponding to the alarm file;
 generating a uniform resource locator (URL) of the alarm file; and
 displaying the alarm file based on the URL of the alarm file.

In some examples, the alarm file corresponds to M data packets wherein M is an integer greater than or equal to 1; obtaining the alarm file by parsing the data packet corresponding to the alarm file includes:
 for each data packet in the M data packets, reading a check character string from a packet header of the data packet;
 in response to that the check character string is a preset check character string, reading a packet header length from the packet header;
 according to the packet header length, reading a file length of the alarm file, a file identifier of the alarm file and a packet sequence number of the data packet from the packet header;
 in a storage structure corresponding to the file identifier, storing a payload part of the data packet in a storage space corresponding to the packet sequence number; and
 in response to that a data length belonging to the alarm file and stored in the storage structure is equal to the file length, taking data belonging to the alarm file and stored in the storage structure as the alarm file.

In some examples, the packet header of the data packet further includes a payload length of the data packet,
 in the storage structure corresponding to the file identifier, storing the payload part of the data packet in the storage space corresponding to the packet sequence number includes:
 based on the file identifier, determining whether the data packet is a first received data packet belonging to the alarm file;
 in response to that the data packet is the first received data packet, creating a storage structure corresponding to the file identifier, storing the payload part of the data packet in the storage space corresponding to the packet sequence number in the storage structure, and storing the data length belonging to the alarm file in the storage structure, wherein the data length is equal to the payload length of the data packet; and
 in response to that the data packet is not the first received data packet, determining the storage structure corresponding to the file identifier, storing the payload part of the data packet in the storage space corresponding to the packet sequence number in the storage structure, accumulating the data length belonging to the alarm file and stored in the storage structure and the payload length of the data packet to obtain an accumulation value and replacing the data length stored in the storage structure with the accumulation value.

In some examples, the alarm file obtained by parsing is stored in a memory and generating the URL of the alarm file includes:
 according to the alarm file stored in the memory, generating the URL of the alarm file through an application program interface (API) for generating URL.

In some examples, before receiving the data packet corresponding to the alarm file sent by the service end through the persistent connection with the service end, the method further includes:
 sending a subscription request message to the service end through the persistent connection, wherein the subscription request message includes a content type; and receiving alarm information corresponding to the alarm file through the persistent connection, wherein the content of the alarm file belongs to the content type.

According to another aspect, an apparatus for displaying an alarm file is provided in the present disclosure. The apparatus includes:
  a receiving module, configured to, through a persistent connection with a service end, receive a data packet corresponding to the alarm file sent by the service end, wherein the service end releases a storage resource occupied by the alarm file after sending the alarm file;
  an parsing module, configured to obtain the alarm file by parsing the data packet corresponding to the alarm file;
  a generating module, configured to generate a uniform resource locator (URL) of the alarm file; and
  a displaying module, configured to display the alarm file based on the URL of the alarm file.

In some examples, the alarm file corresponds to M data packets wherein M is an integer greater than or equal to 1; the parsing module is configured to:
  for each data packet in the M data packets, read a check character string from a packet header of the data packet;
  in response to that the check character string is a preset check character string, read a packet header length from the packet header;
  according to the packet header length, read a file length of the alarm file, a file identifier of the alarm file and a packet sequence number of the data packet from the packet header;
  in a storage structure corresponding to the file identifier, store a payload part of the data packet in a storage space corresponding to the packet sequence number; and
  in response to that a data length belonging to the alarm file and stored in the storage structure is equal to the file length, take data belonging to the alarm file and stored in the storage structure as the alarm file.

In some examples, the packet header of the data packet further includes a payload length of the data packet,
  the parsing module is configured to:
  based on the file identifier, determine whether the data packet is a first received data packet belonging to the alarm file;
  in response to that the data packet is the first received data packet, create a storage structure corresponding to the file identifier, store the payload part of the data packet in the storage space corresponding to the packet sequence number in the storage structure, and store the data length belonging to the alarm file in the storage structure, wherein the data length is equal to the payload length of the data packet; and
  in response to that the data packet is not the first received data packet, determine the storage structure corresponding to the file identifier, store the payload part of the data packet in the storage space corresponding to the packet sequence number in the storage structure, accumulate the data length belonging to the alarm file and stored in the storage structure and the payload length of the data packet to obtain an accumulation value and replace the data length stored in the storage structure with the accumulation value.

In some examples, the alarm file obtained by parsing is stored in a memory and the generating module is configured to:
  according to the alarm file stored in the memory, generate the URL of the alarm file through an application program interface (API) for generating URL.

In some examples, the apparatus further includes: a sending module, where
  the sending module is configured to send a subscription request message to the service end through the persistent connection, wherein the subscription request message includes a content type; and
  the receiving module is further configured to receive alarm information corresponding to the alarm file through the persistent connection, wherein the content of the alarm file belongs to the content type.

According to another aspect, a system for displaying an alarm file is provided in the present disclosure. The system includes a client and a service end; where,
  the service end is configured to send a data packet corresponding to the alarm file to the client through a persistent connection with the client and release a storage resource occupied by the alarm file; and
  the client is configured to: receive the data packet corresponding to the alarm file through the connection with the service end; obtain the alarm file by parsing the data packet corresponding to the alarm file; generate a uniform resource locator (URL) of the alarm file; and display the alarm file based on the URL of the alarm file.

In some examples, the alarm file corresponds to M data packets wherein M is an integer greater than or equal to 1; the client is configured to:
  for each data packet in the M data packets, read a check character string from a packet header of the data packet;
  in response to that the check character string is a preset check character string, read a packet header length from the packet header;
  according to the packet header length, read a file length of the alarm file, a file identifier of the alarm file and a packet sequence number of the data packet from the packet header;
  in a storage structure corresponding to the file identifier, store a payload part of the data packet in a storage space corresponding to the packet sequence number; and
  in response to that a data length belonging to the alarm file and stored in the storage structure is equal to the file length, take data belonging to the alarm file and stored in the storage structure as the alarm file.

In some examples, the packet header of the data packet further includes a payload length of the data packet,
  the client is configured to:
  based on the file identifier, determine whether the data packet is a first received data packet belonging to the alarm file;
  in response to that the data packet is the first received data packet, create a storage structure corresponding to the file identifier, store the payload part of the data packet in the storage space corresponding to the packet sequence number in the storage structure, and store the data length belonging to the alarm file in the storage structure, wherein the data length is equal to the payload length of the data packet; and
  in response to that the data packet is not the first received data packet, determine a storage structure corresponding to the file identifier, store the payload part of the data packet in the storage space corresponding to the packet sequence number in the storage structure, accumulate the data length belonging to the alarm file and stored in the storage structure and the payload length of the data packet to obtain an accumulation value and replace the data length stored in the storage structure with the accumulation value.

In some examples, the client is configured to store the alarm file obtained by parsing in a memory, and generate the URL of the alarm file through an application program interface (API) for generating URL according to the alarm file stored in the memory.

In some examples, the client is further configured to: send a subscription request message to the service end through the persistent connection, wherein the subscription request message comprises a content type; receive alarm information corresponding to the alarm file through the persistent connection, wherein the content of the alarm file belongs to the content type; and the service end is further configured to send the alarm information corresponding to the alarm file to the client through the persistent connection.

According to another aspect, in one or more embodiments of the present disclosure, an electronic device including at least one processor and at least one memory is provided, where the at least one memory is configured to store at least one instruction, and the at least one instruction is loaded and run by the at least one processor to implement the above method of displaying an alarm file.

According to another aspect, in one or more embodiments of the present disclosure, a computer readable storage medium is provided, where the computer readable storage medium is configured to store at least one instruction, and the at least one instruction is loaded and run by a processor to implement the above method of displaying an alarm file.

According to another aspect, in one or more embodiments of the present disclosure, a computer program product is provided, where the computer program product includes a computer program stored in a computer readable storage medium and the computer program is loaded and run by a processor to implement the above method of displaying an alarm file.

The technical solutions provided in the embodiments of the present disclosure may include the following beneficial effects.

A client displays an alarm file based on a URL of the alarm file. The client receives a data packet of the alarm file through a persistent connection, obtains the alarm file by parsing the data packet of the alarm file and generates the URL of the alarm file. In this way, the client may display the alarm file based on the generated URL. Therefore, after the service end acquires an alarm file, the service end may send the alarm file to the client without storing the alarm file, thus improving the real-time-ness of pushing the alarm file. If the client adopts a polling mode, the service end is to firstly store the acquired alarm file. In this way, the client can obtain the URL of the alarm file only when polling the service end and then acquire and display the alarm file from the service end based on the URL. Compared with the polling mode, the service end does not store the alarm file and may release a storage resource after pushing the alarm file to the client so as to reduce occupation of the storage resource of the service end. Further, large consumption of service end resources and bandwidth resources during polling are to be avoided.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

Figure 1:
FIG. 1 is a schematic diagram illustrating a system architecture according to one or more embodiments of the present disclosure.

The definite embodiments of the present disclosure have already been shown by the above accompanying drawings and will be elaborated below. These accompanying drawings and the text descriptions are not to limit the scope of the idea of the present disclosure in any manner, but describe the concepts of the present disclosure for those skilled in the art by referring to specific examples.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

As shown in FIG. 1, in an example of the present disclosure, a system for displaying an alarm file is provided. The system includes a service end 1 and a client 2.

The client 2 may establish a persistent connection with the service end 1. As an example, the persistent connection may be a Websocket connection which is a full duplex bidirectional communication connection.

As an example, the client 2 may be a browser or another application.

The service end 1 may acquire an alarm file. A file type of the alarm file may be a picture file, a video file or a text file or the like.

In some examples, the service end 1 may be a Network Video Recorder (NVR) or an IP CAMERA (IPC) or the like. The service end 1 itself may acquire an alarm file, for example, obtain an alarm file by shooting.

Figure 2:
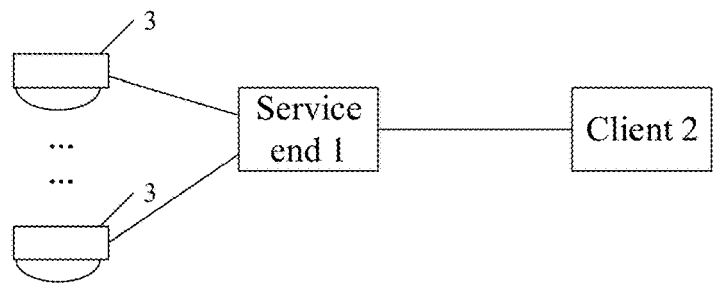
FIG. 2 is a schematic diagram illustrating another system architecture according to one or more embodiments of the present disclosure.

The service end 1 may also be a server. As shown in FIG. 2, the service end 1 may also establish a connection with at least one monitor camera 3.

For each monitor camera 3, the monitor camera 3 may send alarm information to the service end 1 and send at least one alarm file to the service end 1 immediately subsequent to the alarm information.

The alarm information may include at least one of a file number of to-be-sent alarm files, file description information on each alarm file and device information on the monitor camera 3 and the like.

The file description information on the alarm file may include file content description information on the alarm file. For example, if the alarm file is a picture file, the file content description information describes the content of the picture file. The file content description information may include that the picture file is a background image or a foreground image, and/or whether an image in the picture file is a specific object image. In a case of a specific object image, the file content description information may also include feature information on an object corresponding to the specific object image, for example, at least one of features such as age feature and height feature.

The device information on the monitor camera 3 may include an address of the monitor camera 3. The address may include at least one of an Internet Protocol (IP) address or a Media Access Control (MAC) address.

Figure 3:
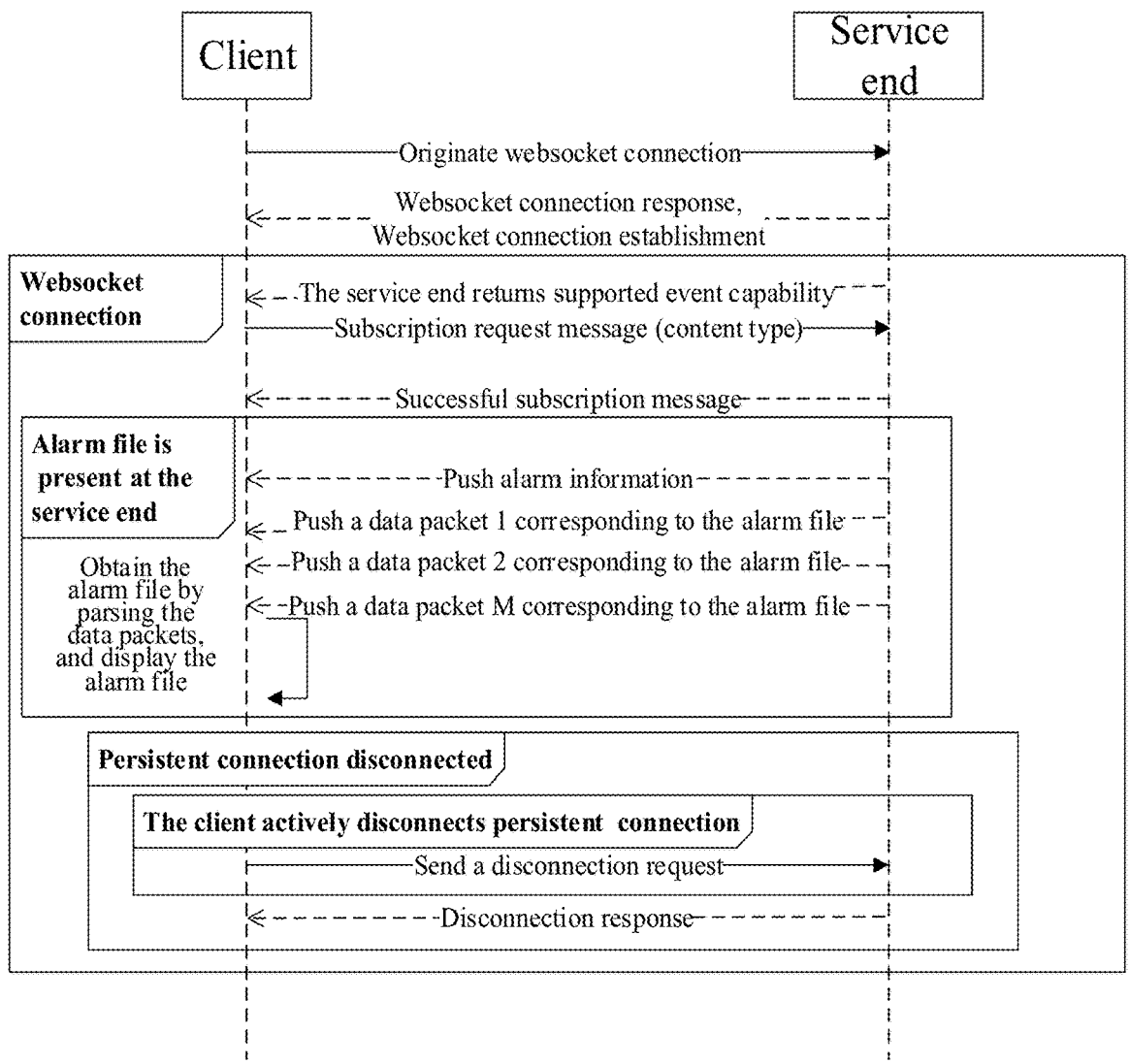
FIG. 3 is a flowchart illustrating a method of acquiring an alarm file according to one or more embodiments of the present disclosure.

As shown in FIG. 3, after establishing a persistent connection (for example, a Websocket connection) with the service end 1, the client 2 may send a subscription request message to the service end 1 through the persistent connection, where the subscription request message includes a content type, so as to subscribe to an alarm file with a file content belonging to the content type in the service end 1.

The content type may include a specific object image or the like. For example, if a specific object is a vehicle, the content type may be a vehicle image. If the content type included in the subscription request message is a vehicle image, an alarm file with the file content belonging to the vehicle image is subscribed to in the service end 1, that is, when acquiring the alarm file belonging to the vehicle image, the service end 1 sends the alarm file to the client 2.

Figure 4:
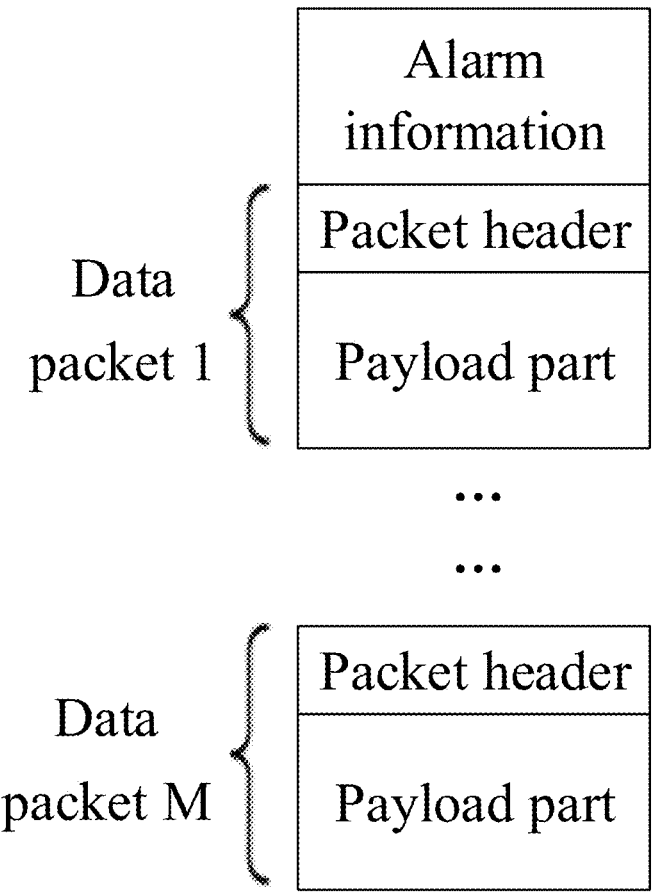
FIG. 4 is a schematic diagram illustrating an alarm file according to one or more embodiments of the present disclosure.

The service end 1 receives the subscription request message and stores the content type included in the subscription request message. As shown in FIG. 4, when acquiring alarm information with information content belonging to the content type, the service end 1 may send the alarm information to the client 2 through the persistent connection; when acquiring an alarm file with the file content belonging to the content type, the service end 1 encapsulates the alarm file into M data packets where M is an integer greater than or equal to 1; for each encapsulated data packet, the service end 1 sends the data packet to the client 2 through the persistent connection; after sending the data packet, the service end 1 releases a storage resource occupied by the data packet. The service end may also release a storage resource occupied by the alarm file after sending M data packets corresponding to the alarm file.

In some examples, releasing the storage resource occupied by the alarm file by the service end includes: releasing all or part of the resource occupied by the alarm file. Sending the alarm file and then releasing the storage resource occupied by the alarm file by the service end may include: sending all of the alarm file and then releasing all or part of the resource occupied by the alarm file by the service end; or, sending part of the alarm file and then releasing part of the resource occupied by the alarm file by the service end. During implementation, the service end sends M data packets and then releases the storage resource occupied by the M data packets, or, the service end may also send X data packets of the alarm file and then releases the storage resource occupied by Y data packets of the X data packets, where X is smaller than or equal to M and Y is smaller than or equal to X.

In some examples, every time one data packet is encapsulated, the service end 1 may send the data packet to the client 2 through the persistent connection.

The client 2 may obtain an alarm file by parsing the received data packet, generate a URL of the alarm file, and display the alarm file based on the URL of the alarm file. The client 2 or the service end 1 may also actively request disconnection of the persistent connection.

Figure 5:
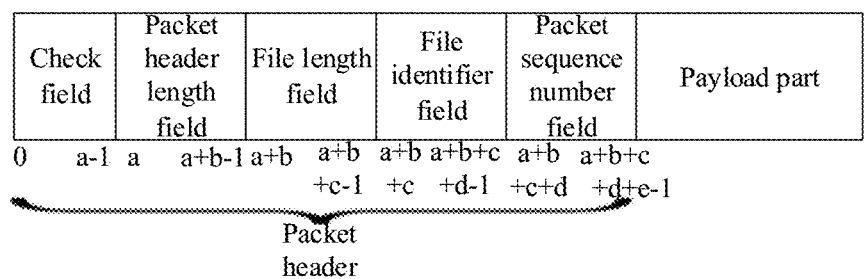
FIG. 5 is a structural schematic diagram illustrating a data packet according to one or more embodiments of the present disclosure.

The data packet includes a packet header and a payload part located after the packet header. The payload part includes the alarm file or a part of the alarm file. As shown in FIG. 5, the packet header may include a check field, a packet header length field, a file length field, a file identifier field and a packet sequence number field. The check field carries a preset check character string, the packet header length field carries a packet header length of the data packet, the file length field carries a file length of the alarm file, the file identifier field carries a file identifier of the alarm file, and the packet sequence number field carries a packet sequence number of the data packet.

The fields such as the check field, the packet header length field, the file length field, the file identifier field and the packet sequence number field may be arranged in multiple sequences in the packet header. An example of one arrangement sequence is enumerated in the present disclosure for descriptions, and other arrangement sequences will no long be enumerated one by one.

In this example, as shown in FIG. 5, the length of the check field is a bytes which are the 0-th to (a−1)-th bytes of the packet header, where a is an integer greater than 1; the length of the packet header length field is b bytes which are the a-th to (a+b−1)-th bytes of the packet header, where b is an integer greater than 1; the length of the file length field is c bytes which are the (a+b)-th to (a+b+c−1)-th bytes of the packet header, where c is an integer greater than 1; the length of the file identifier field is d bytes which are the (a+b+c)-th to (a+b+c+d−1)-th bytes of the packet header where d is an integer greater than 1; and the length of the packet sequence number field is e bytes which are the (a+b+c+d)-th to (a+b+c+d+e−1)-th bytes of the packet header where e is an integer greater than 1.

Figure 6:
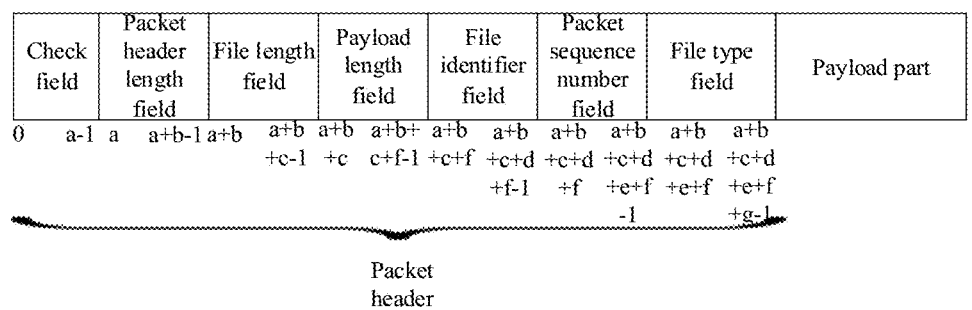
FIG. 6 is a structural schematic diagram illustrating another data packet according to one or more embodiments of the present disclosure.

As shown in FIG. 6, the packet header of the data packet may also include a payload length field for carrying a length of the payload part of the data packet. The payload length field may be located between the file length field and the file identifier field. The length of the payload length field is f bytes which are the (a+b+c)-th to (a+b+c+f−1)-th bytes of the packet header, where f is an integer greater than 1. Correspondingly, the file identifier field is the (a+b+c+f)-th to (a+b+c+d+f−1)-th bytes of the packet header, and the packet sequence number field is the (a+b+c+d+f)-th to (a+b+c+d+f+e−1)-th bytes of the packet header.

As shown in FIG. 6, the packet header of the data packet may also include a file type field for carrying a file type of the alarm file. The file type field may be located after the packet sequence number field. The length of the file type field is g bytes which are the (a+b+c+d+f+e)-th to (a+b+c+d+f+e+g−1)-th bytes of the packet header, where g is an integer greater than 1.

Figure 7:
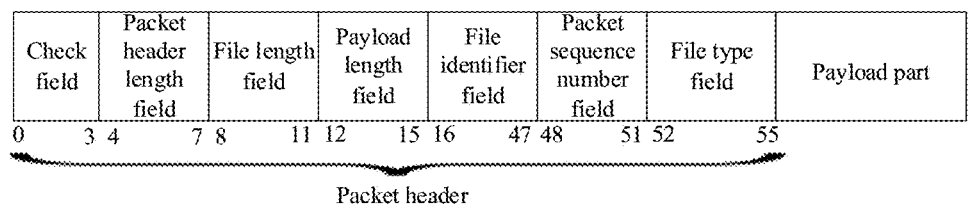
FIG. 7 is a structural schematic diagram illustrating another data packet according to one or more embodiments of the present disclosure.

For example, with reference to FIG. 7, it is assumed that a is 4, b is 4, c is 4, f is 4, d is 32, e is 4, g is 4. That is, the check field is the 0-th to 3rd bytes of the packet header, the packet header length field is the 4th to 7th bytes of the packet header, the file length field is the 8th to 11th bytes of the packet header, the payload length field is the 12th to 15th bytes of the packet header, the file identifier field is the 16th to 47th bytes of the packet header, the packet sequence number field is the 48th to 51st bytes of the packet header, and the file type field is the 52nd to 55th bytes of the packet header.

The packet header of the data packet shown in FIG. 6 may be defined as the following structure form.

```
typedef struct_INTER_HEADER_BINARY_
{
    unsigned char byMagic[4]; // byMagic is check field,
        used as error tolerance, fixed as byMagic[4]={H,E,
        A,D}, H,E,A,D are a preset check character string;
    unsigned int dwHeaderLen; // dwHeaderLen is packet
        header length field, only referring to a length of
        INTER_HEADER_BINARY, for subsequent exten-
        sion of HEADER;
    unsigned int dwDataLen; // dwDataLen is file length field,
        only referring to a total length of file data (excluding
        INTER_HEADER_BINARY);
    unsigned int dwSingleDataLen; // dwSingleDataLen is
        payload length field, only referring to a length of a
        payload part of a single data packet after the alarm file
        of large data volume is packet-divided (excluding
        INTER_HEADER_BINARY), if the alarm file is not
        sent in packets, dwSingleDataLen==dwDataLen;
    unsigned char szpId[32]; //szpId is file identifier field,
        referring to a file identifier of the alarm file in corre-
        sponding structured information to achieve association
        of structured information and binary picture;
    unsigned int dwIndex; // dwIndex is packet sequence
        number field, referring to packet index after the data
        packet is packet-divided to indicate which packet of
        data it is;
    unsigned char byDataType; // byData Type is file type
        field, 0 represents a file type of jpeg picture data;
    unsigned char byRes[2]; which is reserved field
} INTER_HEADER_BINARY, *LPINTER_HEADER_
    BINARY;
```

The client 2 receives M data packets from the service end 1 through the persistent connection; and obtains the alarm file by parsing the packet header of each of the M data packets.

Figure 8:
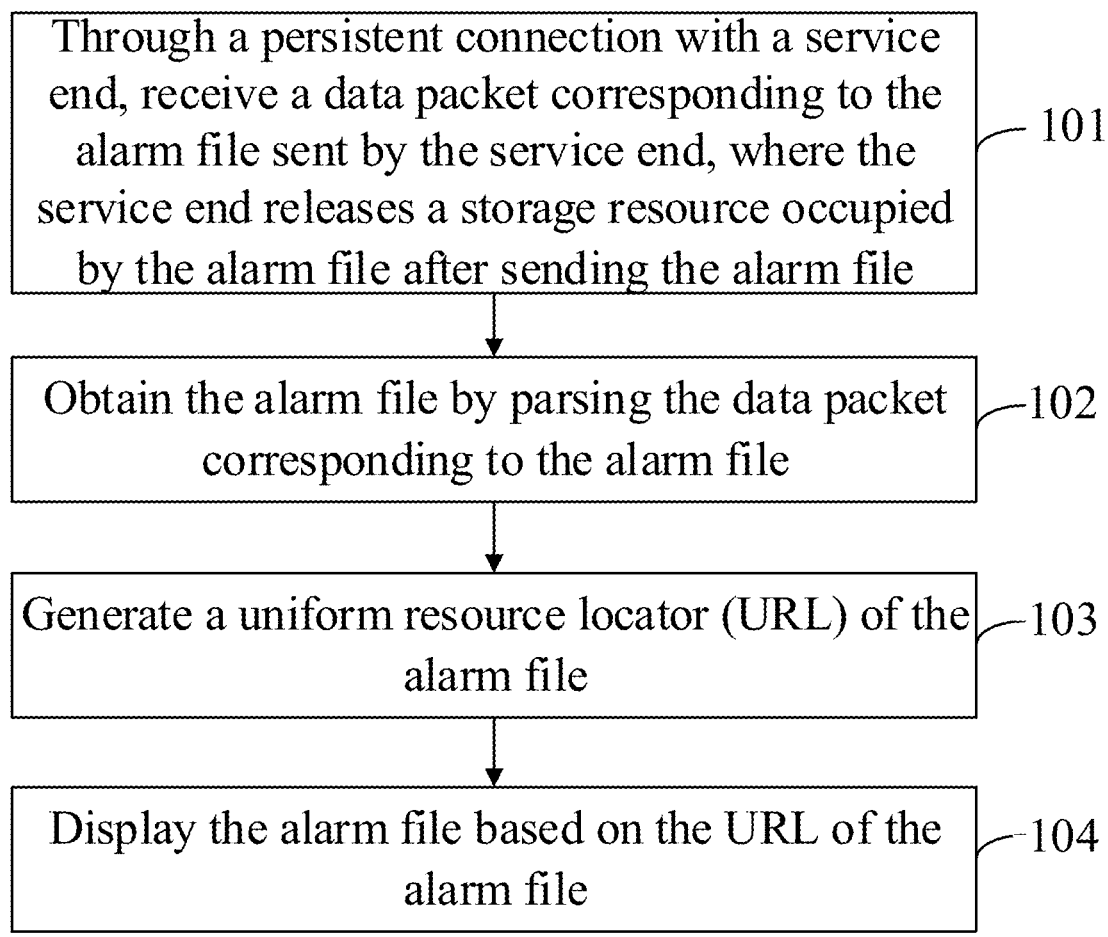
FIG. 8 is a flowchart illustrating a method of displaying an alarm file according to one or more embodiments of the present disclosure.

With reference to FIG. 8, in an example of the present disclosure, a method of displaying an alarm file is provided. The method includes the following steps.

At step 101, through a persistent connection with a service end, a data packet corresponding to the alarm file sent by the service end is received, where the service end releases a storage resource occupied by the alarm file after sending the alarm file.

At step 102, the alarm file is obtained by parsing the data packet corresponding to the alarm file.

At step 103, a uniform resource locator (URL) of the alarm file is generated.

At step 104, the alarm file is displayed based on the URL of the alarm file.

In the examples of the present disclosure, due to presence of a persistent connection with a server, a data packet corresponding to an alarm file of the service end may be received through the persistent connection, the alarm file is obtained by parsing the data packet corresponding to the alarm file, and a URL of the alarm file is generated and thus the alarm file is displayed based on the URL of the alarm file. In this way, it is unnecessary to adopt a polling manner to request an alarm file and the service end can push an alarm file to the client once obtaining it, without storing the alarm file. After pushing the alarm file, the service end may release a storage resource occupied by the alarm file, reducing occupation for the storage resource of the service end. Further, large consumption of service end resources and bandwidth resources during polling will be avoided, and the real-timeness of pushing the alarm file is improved. Due to generation of the URL of the alarm file, the alarm file can be automatically displayed based on the URL.

Figure 9:
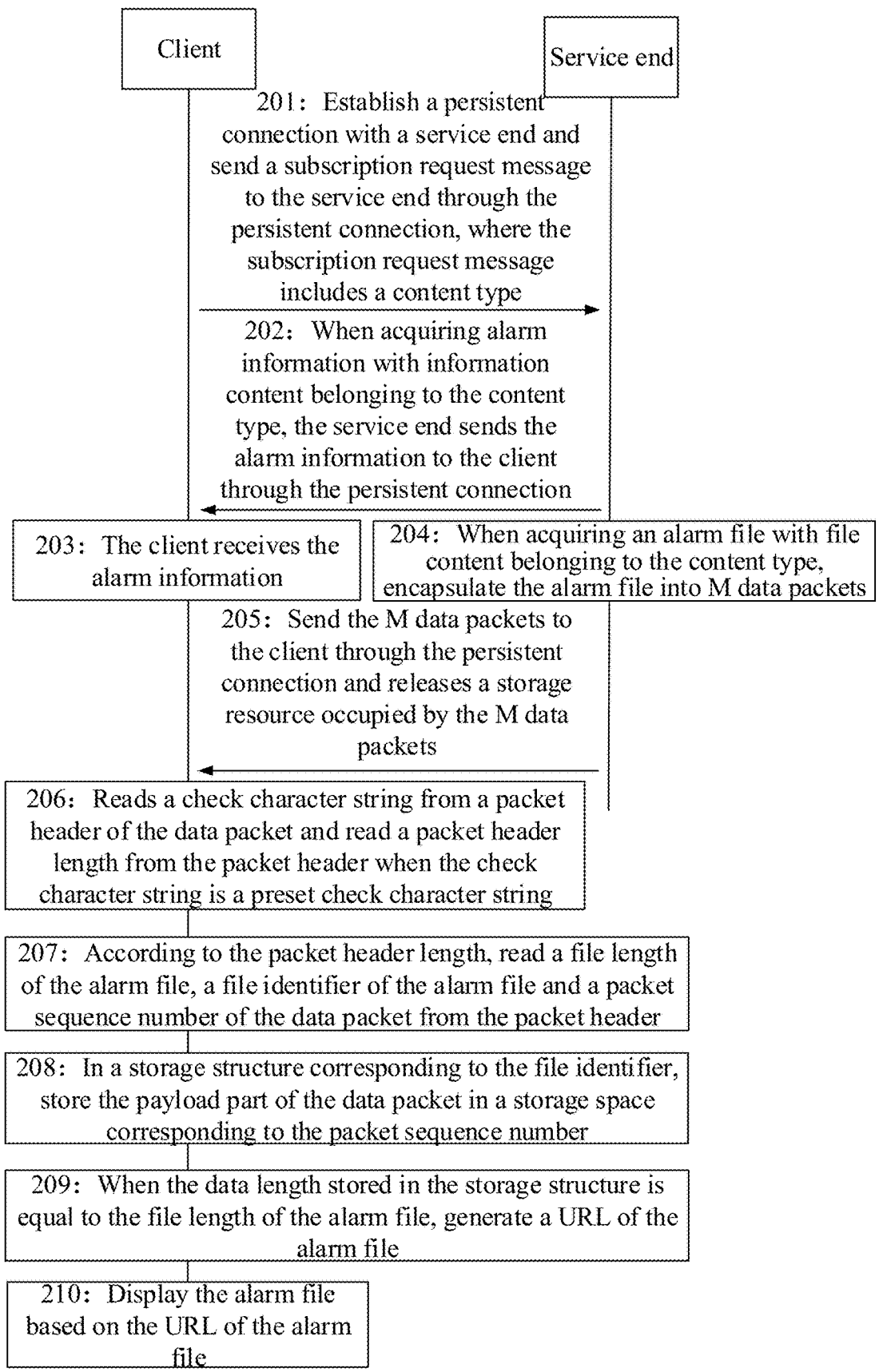
FIG. 9 is a flowchart illustrating another method of displaying an alarm file according to one or more embodiments of the present disclosure.

With reference to FIG. 9, in an example of the present disclosure, another method of displaying an alarm file is provided. The method includes the following steps.

At step 201, a client establishes a persistent connection with a service end and sends a subscription request message to the service end through the persistent connection, where the subscription request message includes a content type.

The persistent connection may be a Websocket connection and the content type may include a specific objet image. For example, if the specific object image is a vehicle image, the content type includes the vehicle image.

At step 202, the service end receives the subscription request message carrying the content type; when acquiring alarm information with information content belonging to the content type, the service end sends the alarm information to the client through the persistent connection.

After receiving the subscription request message, the service end may store the content type included in the subscription request message. In this way, when acquiring alarm information with information content belonging to the content type, the service end may send the alarm information to the client through the persistent connection.

At step 203, the client receives the alarm information.

The client may display the alarm information. Because the alarm information includes the file description information on each alarm file, and the device information on the monitor camera and the like, a user may know about information about the alarm file and the like.

At step 204, when acquiring an alarm file with file content belonging to the content type, the service end encapsulates the alarm file into M data packets.

There is no precedence relationship between step 202 and step 204, that is, the service end may firstly send the alarm information and then encapsulate the data packet; or, the service end may firstly encapsulate the data packet and then send the alarm information; or, the service end may encapsulate the data packet and send the alarm information at the same time.

After acquiring alarm information belonging to the content type, the service end may also acquire an alarm file with file content belonging to the content type and encapsulate the alarm file into M data packets.

For each data packet, the data packet may include a packet header and a payload part located after the packet header. As shown in FIG. 5, the packet header may include a check field, a packet header length field, a file length field, a file identifier field and a packet sequence number field. The check field carries a preset check character string, the packet header length field carries a packet header length of the data packet, the file length field carries a file length of the alarm file, the file identifier field carries a file identifier of the alarm file, and the packet sequence number field carries a packet sequence number of the data packet.

In some examples, as shown in FIG. 6, the packet header of the data packet may also include a payload length field for carrying a length of the payload part of the data packet. The payload length field may be located between the file length field and the file identifier field.

In some examples, as shown in FIG. 6, the packet header of the data packet may also include a file type field for carrying a file type of the alarm file.

At step 205, the service end sends the M data packets to the client through the persistent connection and releases a storage resource occupied by the M data packets.

For the M data packets, the service end sends one data packet to the client each time on the persistent connection.

The service end may also acquire an alarm file with file content belonging to the content type and encapsulate the alarm file into at least one data packet based on the flow shown in steps 204 or 205 and send the at least one data packet to the client through the persistent connection. Thus, when the service end receives an alarm file with file content belonging to the subscribed content type, the service end may send the alarm file to the client without storing the alarm file. In this way, without polling the service end, the real-timeness of acquiring an alarm file can be improved and wastes of service end resource (e.g. the resource may include storage resource) and bandwidth resource can be avoided.

The service end may, after sending the M data packets, release the storage resource occupied by the M data packets, or release the storage resource occupied by some data packets of the M data packets, so as to release the storage resource occupied by the stored file. Further, the service end may, after sending X data packets of the alarm file, release the storage resource occupied by Y data packets of the X data packets where X is smaller than or equal to M and Y is smaller than or equal to X. In some examples, after one data packet is sent, the storage resource occupied by the data packet may be released, thus reducing occupation for the storage resource of the service end.

At step 206, the client receives the data packet and reads a check character string from a packet header of the data packet, and reads a packet header length from the packet header when the check character string is a preset check character string.

The service end is to take a period of time to send the M data packets. In this period of time, some earliest-sent data packets of the M data packets may be transmitted to the client and the client receives the data packets.

In this step, the data packet received by the client is any one of the M data packets, and the data packet received by the client may be a first data packet of the alarm file, or a last data packet of the alarm file, or any one data packet between the first data packet and the last data packet.

As shown in FIG. 5, the check field is a first field having a length of a bytes in the packet header of the data packet; and the packet header length field is a second field having a length of b bytes.

In this step, a check character string is obtained by reading information on first a bytes in the packet header of the data packet, and when the check character string is a preset check character string, a packet header length is obtained by reading information on the a-th to (a+b−1)-th bytes from the packet header of the data packet.

At step 207, according to the packet header length, the client reads a file length of the alarm file, a file identifier of the alarm file and a packet sequence number of the data packet from the packet header.

According to the packet header length, the client may determine a remaining packet header part and a payload part of the data packet, and thus read the remaining packet header part from the data packet.

As shown in FIG. 5, located after the packet header length field is the file length field having a length of c bytes. That is, a first field of the remaining packet header part is the file length field and a file length of the alarm file can be obtained by reading information on the 0-th to (c−1)-th bytes from the remaining packet header part.

As shown in FIG. 5, located after the file length field is the file identifier field having a length of d bytes. A file identifier of the alarm file can be obtained by reading information on the c-th to (c+d−1)-th bytes from the remaining packet header part.

As shown in FIG. 5, located after the file identifier field is the packet sequence number field having a length of e bytes. A packet sequence number of the data packet can be obtained by reading information on the (c+d)-th to (c+d+e−1)-th bytes from the remaining packet header part.

In some examples, as shown in FIG. 5, the packet header of the data packet may also include a payload length field for carrying a length of the payload part of the data packet. The payload length field may be located between the file length field and the file identifier field and has a length of f bytes.

In the packet header of the data packet shown in FIG. 5, the file length of the alarm file is obtained by reading information on the 0-th to (c−1)-th bytes from the remaining packet header part. The length of the payload part of the data packet is obtained by reading information on the c-th to (c+f−1)-th bytes from the remaining packet header part. The file identifier of the alarm file is obtained by reading information on the (c+f)-th to (c+f+d−1)-th bytes from the remaining packet header part. The packet sequence number of the data packet is obtained by reading information on the (c+f+d)-th to (c+f+d+e−1)-th bytes from the remaining packet header part.

In some examples, as shown in FIG. 5, the packet header of the data packet may also include a file type field for carrying a file type of the alarm file. The file type field may be located after the packet sequence number field and has a length of g bytes.

In the packet header of the data packet shown in FIG. 5, the file type of the alarm file is obtained by reading information on the (c+f+d+e)-th to (c+f+d+e+g−1)-th bytes from the remaining packet header part.

At step 208, in a storage structure corresponding to the file identifier, the client stores the payload part of the data packet in a storage space corresponding to the packet sequence number.

In a process of receiving data packets of an alarm file, the client uses one storage structure to cache the payload part of each received data packet belonging to the alarm file. The storage structure corresponds to the file identifier of the alarm file, and the storage structure includes at least one storage space. Each data packet belonging to the alarm file corresponds to one storage space and each data packet corresponds to a different storage space.

The client may be a browser and the storage structure may be located in the memory of the browser.

In some examples, the storage structure may be an array.

In this step, according to the file identifier of the alarm file, it is determined whether the data packet is a first received data packet belonging to the alarm file; if the data packet is the first received data packet, a storage structure corresponding to the file identifier is created, the payload part of the data packet is stored in the storage space corresponding to the packet sequence number in the storage structure; if the data packet is not the first received data packet, the storage structure corresponding to the file identifier is determined, and the payload part of the data packet is stored in the storage space corresponding to the packet sequence number in the storage structure.

In some examples, before the payload part of the data packet is stored in the storage space corresponding to the packet sequence number, it may be further determined whether the payload length of the data packet carried in the payload length field is equal to an actual length of the payload part of the data packet. If the payload length of the data packet carried in the payload length field is equal to the actual length of the payload part of the data packet, it indicates that the payload part of the data packet is not subjected to data loss and the payload part of the data packet is stored in the storage space corresponding to the packet sequence number. If the payload length of the data packet carried in the payload length field is not equal to the actual length of the payload part of the data packet, it indicates that the payload part of the data packet is subjected to data loss, and data of the alarm file stored in the storage structure is discarded.

In some examples, after sending the data packets of the alarm file, the service end may not immediately release the storage resource occupied by the alarm file. In this case, if the client discards the data of the alarm file stored in the storage structure, the client may request the service end to send the data packets included in the alarm file. After receiving the data packets included in the alarm file, the client may notify the service end and the service end may, after receiving the notification, release the storage resource occupied by the alarm file.

In some examples, if the payload part of the data packet is subjected to data loss, the payload part of the data packet may be stored in the storage space corresponding to the packet sequence number, and thus, the content of the displayed alarm file may be partially missing. For example, if the alarm file is a picture, the content of the displayed picture is partially missing.

The packet sequence number may be started from 1 in order, for example, the packet sequence number 1 corresponds to a first storage space in the storage structure, the packet sequence number 2 corresponds to a second storage space in the storage structure and so on, and other packet sequence numbers will no longer be enumerated one by one herein.

As shown in FIG. 6, the packet header of the data packet may also include a payload length of the data packet and a data length belonging to the alarm file may also be stored in the storage structure. Specifically, in a case of receiving the first data packet belonging to the alarm file, a data length belonging to the alarm file is stored in the storage structure, where the data length is equal to a payload length of the first data packet; in a case that the received data packet belonging to the alarm file is not the first data packet belonging to the alarm file, the payload part of the data packet is stored in the storage space corresponding to the packet sequence number and then the data length belonging to the alarm file and stored in the storage structure and the payload length of the data packet may be accumulated to obtain an accumulation value and then the data length belonging to the alarm file and stored in the storage structure is replaced with the accumulation value.

In this step, after the data length belonging to the alarm file and stored in the storage structure is replaced with the accumulation value, it is further determined whether the data length belonging to the alarm file and stored in the storage structure is equal to the file length of the alarm file. If the data length belonging to the alarm file and stored in the storage structure is equal to the file length of the alarm file, step 209 is performed, and if the data length belonging to the alarm file and stored in the storage structure is not equal to the file length of the alarm file, the client performs the operations of steps 206 to 208 again when receiving the data packet.

At step 209, when the data length belonging to the alarm file and stored in the storage structure is equal to the file length of the alarm file, the client takes data belonging to the alarm file and stored in the storage structure as the alarm file and generates a URL of the alarm file.

The client provides an Application Programming Interface (API) for generating URL. The client may input the alarm file stored in the storage structure to the API by calling the API and generate the URL of the alarm file through the API.

In some examples, when the file type of the alarm file is a picture or video, the URL of the alarm file is generated.

In some examples, the URL may be a temporary URL of the alarm file.

In some examples, after obtaining alarm files, the client may store the alarm files in the memory of the client, calculate the number of the alarm files stored in the memory of the client, and delete the earliest-stored alarm files from the memory of the client when the number of the alarm files reaches a preset number threshold. In this way, no effective release due to unlimited occupation of the memory of the client can be avoided.

In some examples, a management storage structure may be established, and the number of storage spaces included in the management storage structure is a preset number threshold. When a URL of an alarm file is generated, if there is still idle storage spaces in the management storage structure, a current time is taken as a storage time of the generated URL of the alarm file, and the generated URL of the alarm file and the storage time are stored in one idle storage space in the management storage structure; if there is no idle storage space in the management storage structure, the earliest-stored URL of the alarm file is obtained from the management storage structure and the alarm file corresponding to the earliest-stored URL is deleted from the memory of the client to clear the storage space where the earliest-stored URL is located, and then the generated URL of the alarm file and the storage time are stored in the cleared storage space.

In some examples, the management storage structure is an array or the like.

At step 210, the client displays the alarm file based on the URL of the alarm file.

When the client is a browser, because the browser performs display based on a URL of a picture or video, in order to avoid modifying an existing logic of the browser, the URL of the alarm file may be generated through an API for generating URL. Thus, the browser can automatically display the alarm file based on the URL.

In some examples, when the alarm file is a text file, the browser may directly display the text file without generating a URL of the text file.

In some examples, the persistent connection between the client and the service end may be disconnected by the client actively or disconnected by the service end actively.

In the examples of the present disclosure, since the client displays an alarm file based on a URL of the alarm file, the client sends a subscription request message to a service end through a persistent connection established with a server. In this way, when receiving an alarm file with file content belonging to the content type, the service end sends M data packets such that the alarm file is parsed out from the M data packets and the URL of the alarm file is generated. Therefore, the client may display the alarm file based on the generated URL. Hence, the efficiency of sending the alarm file can be improved and large consumption of service end resource and bandwidth resource during polling can be avoided. When a URL corresponding to an alarm file in the service end is obtained by polling, because the service end has limited storage space, alarm files acquired by the service end later may overwrite alarm files acquired previously in a case of many alarm files. But those overwritten alarm files on which no polling is performed during the overwriting cannot be pushed to the client for displaying, thus leading to un-reliability of displaying the alarm file. In this solution, each alarm file can be pushed for displaying, improving the reliability of displaying the alarm file. Compared with the manner in which the client obtains a URL from the service end storing alarm files by polling, in this solution, because the client stores an alarm file in its memory and generates a URL corresponding to the alarm file, it is unnecessary for the service end to store the alarm file, thus the storage resource occupied by the alarm file can be released after the alarm file is pushed, thereby reducing occupation of the storage space of the service end. Furthermore, the packet header of the data packet includes a check field, a packet header length field, a file length field, a file identifier field and a packet sequence number field. The check field carries a preset check character string, the packet header length field carries a packet header length of the data packet, the file length field carries a file length of the alarm file, the file identifier field carries a file identifier of the alarm file, and the packet sequence number field carries a packet sequence number of the data packet. In this case, based on each field of the packet header, M data packets belonging to one alarm file can be successfully identified and the alarm file is parsed out.

An apparatus example is described below and may be used to implement the method example of the present disclosure. For those details not disclosed in the apparatus example of the present disclosure, reference may be made to the method example of the present disclosure.

Figure 10:
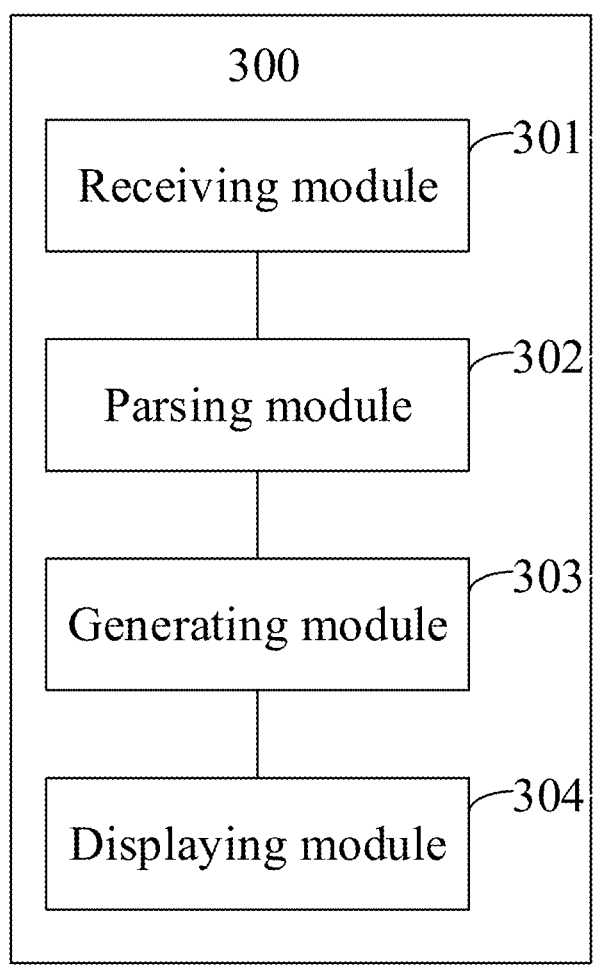
FIG. 10 is a structural schematic diagram illustrating an apparatus for displaying an alarm file according to one or more embodiments of the present disclosure.

With reference to FIG. 10, in an example of the present disclosure, an apparatus 300 for displaying an alarm file is provided. The apparatus 300 may include:
- a receiving module 301, configured to, through a persistent connection with a service end, receive a data packet corresponding to the alarm file sent by the service end, wherein the service end releases a storage resource occupied by the alarm file after sending the alarm file;
- an parsing module 302, configured to obtain the alarm file by parsing the data packet corresponding to the alarm file;
- a generating module 303, configured to generate a uniform resource locator (URL) of the alarm file; and
- a displaying module 304, configured to display the alarm file based on the URL of the alarm file.

In some examples, the alarm file corresponds to M data packets wherein M is an integer greater than or equal to 1; the parsing module 302 is configured to:
- for each data packet in the M data packets, read a check character string from a packet header of the data packet;
- when the check character string is a preset check character string, read a packet header length from the packet header;
- according to the packet header length, read a file length of the alarm file, a file identifier of the alarm file and a packet sequence number of the data packet from the packet header;
- in a storage structure corresponding to the file identifier, store a payload part of the data packet in a storage space corresponding to the packet sequence number; and
- when a data length belonging to the alarm file and stored in the storage structure is equal to the file length, take data belonging to the alarm file and stored in the storage structure as the alarm file.

In some examples, the packet header of the data packet further includes a payload length of the data packet, the parsing module 302 is configured to:
- based on the file identifier, determine whether the data packet is a first received data packet belonging to the alarm file;
- if the data packet is the first received data packet, create a storage structure corresponding to the file identifier, store the payload part of the data packet in the storage space corresponding to the packet sequence number in the storage structure, and store the data length belonging to the alarm file in the storage structure, wherein the data length is equal to the payload length of the data packet; and
- if the data packet is not the first received data packet, determine the storage structure corresponding to the file identifier, store the payload part of the data packet in the storage space corresponding to the packet sequence number in the storage structure, accumulate the data length belonging to the alarm file and stored in the storage structure and the payload length of the data packet to obtain an accumulation value and replace the data length stored in the storage structure with the accumulation value.

In some examples, the alarm file obtained by parsing is stored in a memory and the generating module 303 is configured to:
- according to the alarm file stored in the memory, generate a URL of the alarm file through an application program interface (API) for generating URL.

In some examples, the apparatus 300 further includes a sending module, wherein,
- the sending module is configured to send a subscription request message to the service end through the persistent connection, wherein the subscription request message includes a content type; and
- the receiving module is further configured to receive alarm information corresponding to the alarm file through the persistent connection, wherein the content of the alarm file belongs to the content type.

In the examples of the present disclosure, the displaying module displays an alarm file based on a URL of the alarm file. Due to presence of a persistent connection with a server, the receiving module may receive a data packet corresponding to the alarm file of the service end through the persistent connection, the parsing module obtains the alarm file by parsing the data packet corresponding to the alarm file, the generating module generates a URL of the alarm file through an API for generating URL, and the displaying module automatically displays the alarm file based on the URL. In this case, after acquiring the alarm file, the service end may send the alarm file to the apparatus without storing the alarm file, and may release the storage resource occupied by the alarm file after pushing the alarm file, thereby improving the real-timeness of pushing the alarm file and reducing the occupation for the storage resource of the service end. Further, large consumption of service end resource and bandwidth resource during polling can be avoided.

The specific manner in which various modules in the apparatus of the above examples perform operations is already detailed in the examples relating to the method and will not be repeated herein.

Figure 11:
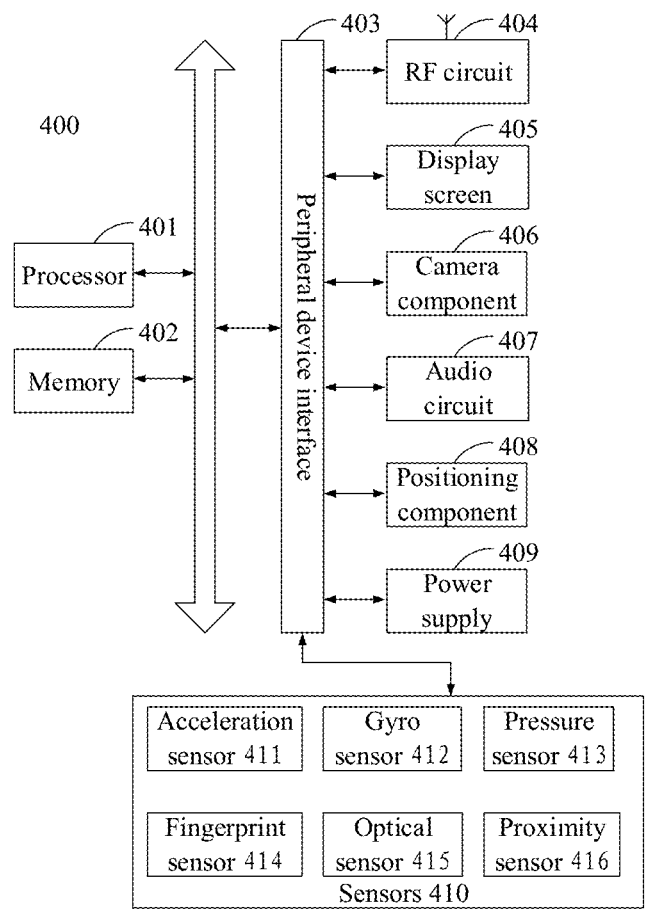
FIG. 11 is a structural schematic diagram illustrating an electronic device according to one or more embodiments of the present disclosure.

FIG. 11 is a structural block diagram illustrating an electronic device 400 according to one or more examples of the present disclosure. The electronic device 400 may run the above client and may be a portable mobile terminal, such as smart phone, tablet computer, laptop computer, or desktop computer. The electronic device 400 may also be referred to as a user device, a portable terminal, a laptop terminal and a desktop terminal and the like.

Generally, the electronic device 400 includes a processor 401 and a memory 402.

The processor 401 may include one or more processing cores, for example, 4-core processor, 8-core processor etc. The processor 401 may be implemented by at least one hardware form of Digital Signal Processing (DSP), Field-Programmable Gate Array (FPGA), and Programmable Logic Array (PLA). The processor 401 may also include a master processor and a co-processor, where the master processor is a processor for processing data in awakened state, which is also called Central Processing Unit (CPU); the co-processor is a low power processor for processing data in a standby state. In some examples, the processor 401 may be integrated with a Graphics Processing Unit (GPU) which is in charge of rendering and painting for contents to be displayed on a display screen. In some examples, the processor 401 may also include an artificial intelligence (AI) processor for performing computer operations relating to machine learning.

The memory 402 may include one or more computer readable storage mediums and the computer readable storage medium may be non-transient. The memory 402 may also include a high speed random access memory and a non-volatile memory, for example, one or more disk storage devices and flash storage devices. In some examples, the non-transient computer readable storage medium in the memory 402 stores at least one instruction which is executed by the processor 401 to implement the method of displaying an alarm file according to the above method examples of the present disclosure.

In some examples, the electronic device 400 may further include: a peripheral device interface 403 and at least one peripheral device. The processor 401, the memory 402 and the peripheral device 403 may be connected with each other via a bus or signal line. Each peripheral device may be connected to the peripheral device interface 403 via a bus, a signal line or a circuit board. Specifically, the peripheral device includes at least one of a radio frequency circuit 404, a touch display screen 405, a camera 406, an audio circuit 407, a positioning component 408 and a power supply 409.

The peripheral device interface 403 may connect at least one peripheral device relating to Input and Output (I/O) to the processor 401 and the memory 402. In some examples, the processor 401, the memory 402 and the peripheral device interface 403 are integrated into a same chip or circuit board; in some other examples, any one or two of the processor 401, the memory 402 and the peripheral device interface 403 may be implemented on a single chip or circuit board, which is not limited herein.

The radio frequency circuit 404 receives and sends radio frequency (RF) signals which are also called electromagnetic signals. The RF circuit 404 communicates with a communication network or another communication device through electromagnetic signals. The RF circuit 404 converts electrical signals into electromagnetic signals for sending, or converts received electromagnetic signals into electrical signals. In some examples, the RF circuit 404 includes an antenna system, a RF transceiver, one or more amplifiers, a tuner, an oscillator, a digital signal processor, an encoding and decoding chip set and a user identity module card and the like. The RF circuit 404 may communication with other terminals by at least one wireless communication protocol. The wireless communication protocol includes but not limited to: World-Wide Web, Metropolitan Area Network, intranet, and mobile communication network of each generation (2G, 3G, 4G and 5G), wireless local area network, and/or, Wireless Fidelity (WiFi) network. In some examples, the RF circuit 404 may further include circuits relating to Near Field Communication (NFC), which is not limited herein.

The display screen 405 displays a user interface (UI). The UI may include graphics, text, icon, video and any combination thereof. When the display screen 405 is a touch display screen, the display screen 405 further has the capability to acquire touch signals on or above the surface of the display screen 405. The touch signals may be input as control signals into the processor 401 for processing. The display screen 405 may also provide a virtual button and/or a virtual keyboard, which are also called soft button and/or soft keyboard. In some examples, there may be one display screen 405 which is disposed on a front panel of the electronic device 400. In some other examples, there may be two display screens 405 which are disposed respectively on different surfaces of the electronic device 400 or designed in a folding manner. In some examples, the display screen 405 may be a flexible display screen which is disposed on a bending surface or a folding surface of the electronic device 400. Further, the display screen 405 may also be disposed into irregular non-rectangular shape, i.e. special-shaped screen. The display screen 405 may be manufactured using materials Liquid Crystal Display (LCD) and Organic Light-Emitting Diode (OLED) and the like.

The camera component 406 acquires images or videos. In some examples, the camera component 406 includes a front camera and a rear camera. Generally, the front camera is disposed on a front panel of the electronic device 400 and the rear camera is disposed on a backplate of the electronic device 400. In some examples, there are at least two rear cameras which are any one of a main camera, a depth-of-field camera, a wide-angle camera and a long-focus camera, so as to achieve background virtualization function of the main camera and the depth-of-field camera in a fusion manner, and achieve panorama shooting and Virtual Reality (VR) shooting function of the main camera and the wide-angle camera and other fusion shooting functions in a fusion manner. In some examples, the camera component 406 may further include a single color temperature flashlight or a dual color temperature flashlight. The dual color temperature flash light refers to a combination of a warm light flashlight and a cold light flashlight, and may be used for light compensation under different color temperatures.

The audio circuit 407 may include a microphone or a loudspeaker. The microphone acquires acoustic waves of user and environment and convert the acoustic waves into electrical signals and then input them into the processor 401 for processing, or input them into the RF circuit 404 to achieve voice communication. For the purpose of stereophonic acquisition and noise reduction, there may be a plurality of microphones to be disposed respectively at different parts of the electronic device 400. The microphone may also be an array microphone or an omni-directional acquisition microphone. The loudspeaker converts electrical signals from the processor 401 or the RF circuit 404 into acoustic waves. The loudspeaker may be a traditional thin film loudspeaker or a piezoelectric ceramic loudspeaker. When the loudspeaker is a piezoelectric ceramic loudspeaker, the loudspeaker can convert electrical signals into acoustic waves audible to human or convert electrical signals into acoustic waves inaudible to human for distance measurement etc. In some examples, the audio circuit 407 may also include a earphone plughole.

The positioning component 408 positions a current geographical location of the electronic device 400 to achieve navigation or Location Based Service (LBS). The positioning component 408 may be a positioning component based on USA Global Positioning System, or China Beidou System or Russian Galileo System.

The power supply 409 supplies power to various components of the electronic device 400. The power supply 409 may be direct current, alternating current, disposable battery or chargeable battery. When the power supply 409 includes a chargeable battery, the chargeable battery may be a wired chargeable battery or a wireless chargeable battery. The wired chargeable battery refers to a battery chargeable by a wire line and the wireless chargeable battery refers to a battery chargeable by wireless coil. The chargeable battery may also support quick charge technology.

In some examples, the electronic device 400 further includes one or more sensors 410. The one or more sensors 410 include but not limited to: an acceleration sensor 411, a gyro sensor 412, a pressure sensor 413, a fingerprint sensor 414, an optical sensor 415 and a proximity sensor 416.

The acceleration sensor 411 may detect a size of an acceleration on three coordinate axes of a coordinate system established by the electronic device 400. For example, the acceleration sensor 411 may detect components of a gravity acceleration on three coordinate axes. The processor 401 may, based on gravity acceleration signals acquired by the acceleration sensor 411, control the touch display screen 405 to display the user interface in horizontal view or longitudinal view. The acceleration sensor 411 may also be used for acquisition of motion data of a game or a user.

The gyro sensor 412 may detect a body direction and a rotation angle of the electronic device 400. The gyro sensor 412 may cooperate with the acceleration sensor 411 to acquire 3D actions of a user for the electronic device 400. The processor 401 may achieve the following functions based on data acquired by the gyro sensor 412: action sensing (for example, change the UI based on an inclination operation of the user), image stabilization during shooting, game control and inertial navigation.

The pressure sensor 413 may be disposed at a side frame of the electronic device 400 and/or a lower layer of the touch display screen 405. When the pressure sensor 413 is disposed at a side frame of the electronic device 400, the pressure sensor 413 can detect a grip signal of a user for the electronic device 400, and the processor 401 perform left and right hand recognition or quick operation based on the grip signal acquired by the pressure sensor 413. When the pressure sensor 413 is disposed at a lower layer of the touch display screen 405, the processor 401 performs control on operable controls on the UI based on pressure operations of the user on the touch display screen 405. The operable control includes at least one of a button control, a scroll bar control, an icon control and menu control.

The fingerprint sensor 414 acquires a fingerprint of a user and the processor 401 recognizes an identity of the user based on the fingerprint acquired by the fingerprint sensor 414 or the fingerprint sensor 414 recognizes the identity of the user based on the acquired fingerprint. When the identity of the user is recognized as trustable identity, the processor 401 authorizes the user to perform relevant sensitive operations which include unlocking screen, viewing encrypted information, downloading software, making payment and modifying settings and the like. The fingerprint sensor 414 may be disposed on a front surface, a rear surface or a side surface of the electronic device 400. When the electronic device 400 is provided with a physical button or manufacturer logo, the fingerprint sensor 414 may be integrated with the physical button or the manufacturer logo together.

The optical sensor 415 acquires an environmental light intensity. In an example, the processor 401 may control a display brightness of the touch display screen 405 based on the environmental light intensity acquired by the optical sensor 415. Specifically, when the environmental light intensity is high, the display brightness of the touch display screen 405 is adjusted to higher; when the environmental light intensity is low, the display brightness of the touch display screen 405 is adjusted to lower. In another example, the processor 401 may dynamically adjust a shooting parameter of the camera component 406 based on the environmental light intensity acquired by the optical sensor 415.

The proximity sensor 416, also called distance sensor, is usually disposed at a front panel of the electronic device 400. The proximity sensor 416 acquires a distance between a user and a front surface of the electronic device 400. In an example, when the proximity sensor 416 detects that the distance between the user and the front surface of the electronic device 400 gradually decreases, the processor 401 controls the touch display screen 405 to switch from a screen-on state to a screen-off state; when the proximity sensor 416 detects that the distance between the user and the front surface of the electronic device 400 gradually increases, the processor 401 controls the touch display screen 405 to switch from a screen-off state to a screen-on state.

Those skilled in the art may understand that the structure shown in FIG. 11 does not constitute limitation to the electronic device 400 and may include more or fewer components than shown or combine some components or adopt different component arrangements.

In the examples of the present disclosure, due to presence of a persistent connection with a service end, a data packet corresponding to an alarm file of the service end may be received through the persistent connection, the processor obtains the alarm file by parsing the data packet corresponding to the alarm file and generates a URL of the alarm file, and thus displays the alarm file in the display screen based on the URL. In this case, it is unnecessary for the processor to request an alarm file by polling, and the service end may push the alarm file to the electronic device once obtaining it without storing the alarm file, and thus may release the storage resource occupied by the alarm file after pushing the alarm file, thereby reducing the occupation for the storage resource of the service end. Further, large consumption of service end resource and bandwidth resource during polling can be avoided and the real-timeness of pushing the alarm file can be improved. Because the processor generates the URL of the alarm file, the processor can automatically display the alarm file based on the URL.

In an example, a computer readable storage medium is further provided in the present disclosure. The computer readable storage medium stores code instructions which are executed by a processor to implement the method of displaying an alarm file according to the above examples. For example, the non-volatile computer readable storage medium may be a read only memory (ROM), a random access memory (RAM), a CD-ROM, a magnetic tape, a floppy disk, and an optical data storage device etc.

In the examples of the present disclosure, the processor receives a data packet corresponding to an alarm file of the service end through a persistent connection, obtains the alarm file by parsing the data packet corresponding to the alarm file, generates a URL of the alarm file and thus displays the alarm file based on the URL of the alarm file. In this case, it is unnecessary for the processor to request an alarm file by polling, and the service end may not store the alarm file and may release the storage resource occupied by the alarm file after pushing the alarm file, thereby reducing the occupation for the storage resource of the service end. Further, large consumption of service end resource and bandwidth resource during polling can be avoided and the real-timeness of pushing the alarm file can be improved. Because the processor generates the URL of the alarm file, the processor can automatically display the alarm file based on the URL.

In an example, a computer program product is further provided in the present disclosure. The computer program product includes a computer program stored in a computer readable storage medium and the computer program is loaded and run by a processor to implement the method of displaying an alarm file according to the above examples.

In the examples of the present disclosure, the processor receives a data packet corresponding to an alarm file of the service end through a persistent connection, obtains the alarm file by parsing the data packet corresponding to the alarm file, generates a URL of the alarm file and thus displays the alarm file based on the URL of the alarm file. In this case, it is unnecessary for the processor to request an alarm file by polling, and the service end may not store the alarm file and may release the storage resource occupied by the alarm file after pushing the alarm file, thereby reducing the occupation for the storage resource of the service end. Further, large consumption of service end resource and bandwidth resource during polling can be avoided and the real-timeness of pushing the alarm file can be improved. Because the processor generates the URL of the alarm file, the processor can automatically display the alarm file based on the URL.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of displaying an alarm file, performed by a client, comprising:
    through a persistent connection with a service end, receiving a data packet corresponding to the alarm file sent by the service end, wherein the service end releases a storage resource occupied by the alarm file after sending the alarm file;
    reading a check character string from a packet header of the data packet, wherein the check field is a first field in the packet header of the data packet;
    in response to determining that the check character string is a preset check character string, obtaining the alarm file by parsing the data packet corresponding to the alarm file;
    generating a uniform resource locator (URL) of the alarm file; and
    displaying the alarm file based on the URL of the alarm file;
    wherein the alarm file obtained by parsing is stored in a memory and generating the URL of the alarm file comprises:
    according to the alarm file stored in the memory, generating the URL of the alarm file through an application program interface (API) for generating URL;
    wherein before receiving the data packet corresponding to the alarm file sent by the service end through the persistent connection with the service end, the method further comprises:
    sending a subscription request message to the service end through the persistent connection, wherein the subscription request message comprises a content type; and
    receiving alarm information corresponding to the alarm file through the persistent connection, wherein the content of the alarm file belongs to the content type.

2. The method of claim 1, wherein the alarm file corresponds to M data packets wherein M is an integer greater than or equal to 1; obtaining the alarm file by parsing the data packet corresponding to the alarm file comprises:
    for each data packet in the M data packets,
    in response to determining that the check character string is a preset check character string, reading a packet header length from the packet header;
    according to the packet header length, reading a file length of the alarm file, a file identifier of the alarm file and a packet sequence number of the data packet from the packet header;
    in a storage structure corresponding to the file identifier, storing a payload part of the data packet in a storage space corresponding to the packet sequence number; and
    in response to determining that a data length belonging to the alarm file and stored in the storage structure is equal to the file length, determining that the alarm file has been completely obtained.

3. The method of claim 2, wherein the packet header of the data packet further comprises a payload length of the data packet,
    in the storage structure corresponding to the file identifier, storing the payload part of the data packet in the storage space corresponding to the packet sequence number comprises:

based on the file identifier, determining whether the data packet is a first received data packet belonging to the alarm file;

in response to determining that the data packet is the first received data packet, creating a storage structure corresponding to the file identifier, storing the payload part of the data packet in the storage space corresponding to the packet sequence number in the storage structure, and storing the data length belonging to the alarm file in the storage structure, wherein the data length is equal to the payload length of the data packet; and in response to determining that the data packet is not the first received data packet, determining a storage structure corresponding to the file identifier, storing the payload part of the data packet in the storage space corresponding to the packet sequence number in the storage structure, accumulating the data length belonging to the alarm file and stored in the storage structure and the payload length of the data packet to obtain an accumulation value and replacing the data length stored in the storage structure with the accumulation value.

4. An electronic device, comprising at least one processor and at least one memory, wherein the at least one memory is configured to store at least one instruction, and the at least one instruction is loaded and run by the at least one processor to implement the method of displaying an alarm file according to claim 1.

5. The electronic device of claim 4, wherein the alarm file corresponds to M data packets wherein M is an integer greater than or equal to 1; obtaining the alarm file by parsing the data packet corresponding to the alarm file comprises:

for each data packet in the M data packets, in response to determining that the check character string is a preset check character string, reading a packet header length from the packet header;

according to the packet header length, reading a file length of the alarm file, a file identifier of the alarm file and a packet sequence number of the data packet from the packet header;

in a storage structure corresponding to the file identifier, storing a payload part of the data packet in a storage space corresponding to the packet sequence number; and in response to determining that a data length belonging to the alarm file and stored in the storage structure is equal to the file length, determining that the alarm file has been completely obtained.

6. The electronic device of claim 5, wherein the packet header of the data packet further comprises a payload length of the data packet, in the storage structure corresponding to the file identifier, storing the payload part of the data packet in the storage space corresponding to the packet sequence number comprises:

based on the file identifier, determining whether the data packet is a first received data packet belonging to the alarm file;

in response to determining that the data packet is the first received data packet, creating a storage structure corresponding to the file identifier, storing the payload part of the data packet in the storage space corresponding to the packet sequence number in the storage structure, and storing the data length belonging to the alarm file in the storage structure, wherein the data length is equal to the payload length of the data packet; and in response to determining that the data packet is not the first received data packet, determining a storage structure corresponding to the file identifier, storing the payload part of the data packet in the storage space corresponding to the packet sequence number in the storage structure, accumulating the data length belonging to the alarm file and stored in the storage structure and the payload length of the data packet to obtain an accumulation value and replacing the data length stored in the storage structure with the accumulation value.

7. A system for displaying an alarm file, comprising a client and a service end; wherein, the service end is configured to send a data packet corresponding to the alarm file to the client through a persistent connection with the client and release a storage resource occupied by the alarm file; and the client is configured to: receive the data packet corresponding to the alarm file through the connection with the service end; read a check character string from a packet header of the data packet, wherein the check field is a first field in the packet header of the data packet; in response to determining that the check character string is a preset check character string, obtain the alarm file by parsing the data packet corresponding to the alarm file; generate a uniform resource locator (URL) of the alarm file; and display the alarm file based on the URL of the alarm file;

the client is configured to store the alarm file obtained by parsing in a memory, and generate the URL of the alarm file through an application program interface (API) for generating URL according to the alarm file stored in the memory;

the client is further configured to: send a subscription request message to the service end through the persistent connection, wherein the subscription request message comprises a content type; receive alarm information corresponding to the alarm file through the persistent connection, wherein the content of the alarm file belongs to the content type; and the service end is further configured to send the alarm information corresponding to the alarm file to the client through the persistent connection.

8. The system of claim 7, wherein the alarm file corresponds to M data packets wherein M is an integer greater than or equal to 1; the client is configured to:

for each data packet in the M data packets, in response to determining that the check character string is a preset check character string, read a packet header length from the packet header;

according to the packet header length, read a file length of the alarm file, a file identifier of the alarm file and a packet sequence number of the data packet from the packet header;

in a storage structure corresponding to the file identifier, store a payload part of the data packet in a storage space corresponding to the packet sequence number; and in response to determining that a data length belonging to the alarm file and stored in the storage structure is equal to the file length, determining that the alarm file has been completely obtained.

9. The system of claim 8, wherein the packet header of the data packet further comprises a payload length of the data packet, the client is configured to:
- based on the file identifier, determine whether the data packet is a first received data packet belonging to the alarm file;
- in response to determining that the data packet is the first received data packet, create a storage structure corresponding to the file identifier, store the payload part of the data packet in the storage space corresponding to the packet sequence number in the storage structure, and store the data length belonging to the alarm file in the storage structure, wherein the data length is equal to the payload length of the data packet; and
- in response to determining that the data packet is not the first received data packet, determine a storage structure corresponding to the file identifier, store the payload part of the data packet in the storage space corresponding to the packet sequence number in the storage structure, accumulate the data length belonging to the alarm file and stored in the storage structure and the payload length of the data packet to obtain an accumulation value and replace the data length stored in the storage structure with the accumulation value.

10. A non-transitory computer readable storage medium with at least one instruction stored thereon, wherein the at least one instruction is loaded and run by a processor to perform operations comprising:
- through a persistent connection with a service end, receiving a data packet corresponding to the alarm file sent by the service end, wherein the service end releases a storage resource occupied by the alarm file after sending the alarm file;
- reading a check character string from a packet header of the data packet, wherein the check field is a first field in the packet header of the data packet;
- in response to determining that the check character string is a preset check character string, obtaining the alarm file by parsing the data packet corresponding to the alarm file;
- generating a uniform resource locator (URL) of the alarm file; and
- displaying the alarm file based on the URL of the alarm file;
- wherein the alarm file obtained by parsing is stored in a memory and generating the URL of the alarm file comprises:
- according to the alarm file stored in the memory, generating the URL of the alarm file through an application program interface (API) for generating URL;
- wherein before receiving the data packet corresponding to the alarm file sent by the service end through the persistent connection with the service end, the method further comprises:
- sending a subscription request message to the service end through the persistent connection, wherein the subscription request message comprises a content type; and
- receiving alarm information corresponding to the alarm file through the persistent connection, wherein the content of the alarm file belongs to the content type.

11. The storage medium of claim 10, wherein the alarm file corresponds to M data packets wherein M is an integer greater than or equal to 1; obtaining the alarm file by parsing the data packet corresponding to the alarm file comprises:
for each data packet in the M data packets,
- in response to determining that the check character string is a preset check character string, reading a packet header length from the packet header;
- according to the packet header length, reading a file length of the alarm file, a file identifier of the alarm file and a packet sequence number of the data packet from the packet header;
- in a storage structure corresponding to the file identifier, storing a payload part of the data packet in a storage space corresponding to the packet sequence number; and
- in response to determining that a data length belonging to the alarm file and stored in the storage structure is equal to the file length, determining that the alarm file has been completely obtained.

12. The storage medium of claim 11, wherein the packet header of the data packet further comprises a payload length of the data packet,
in the storage structure corresponding to the file identifier, storing the payload part of the data packet in the storage space corresponding to the packet sequence number comprises:
- based on the file identifier, determining whether the data packet is a first received data packet belonging to the alarm file;
- in response to determining that the data packet is the first received data packet, creating a storage structure corresponding to the file identifier, storing the payload part of the data packet in the storage space corresponding to the packet sequence number in the storage structure, and storing the data length belonging to the alarm file in the storage structure, wherein the data length is equal to the payload length of the data packet; and
- in response to determining that the data packet is not the first received data packet, determining a storage structure corresponding to the file identifier, storing the payload part of the data packet in the storage space corresponding to the packet sequence number in the storage structure, accumulating the data length belonging to the alarm file and stored in the storage structure and the payload length of the data packet to obtain an accumulation value and replacing the data length stored in the storage structure with the accumulation value.

* * * * *